United States Patent
Shrivastava et al.

(10) Patent No.: US 10,321,513 B2
(45) Date of Patent: Jun. 11, 2019

(54) METHOD FOR PDCP CONTROL PDU TRANSMISSION BY USER EQUIPMENT (UE)

(71) Applicant: Samsung Electronics Co., Ltd., Gyeonggi-do (KR)

(72) Inventors: Vinay Kumar Shrivastava, Bangalore (IN); Ankit Srivastav, Bangalore (IN); Sivashankar Sekar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 15/239,496

(22) Filed: Aug. 17, 2016

(65) Prior Publication Data
US 2017/0055283 A1 Feb. 23, 2017

(30) Foreign Application Priority Data

Aug. 17, 2015 (IN) .................. 4301/CHE/2015 PS
Mar. 31, 2016 (IN) .................. 4301/CHE/2015 CS

(51) Int. Cl.
| | |
|---|---|
| H04W 76/28 | (2018.01) |
| H04W 28/02 | (2009.01) |
| H04W 76/15 | (2018.01) |
| H04W 28/08 | (2009.01) |
| H04W 72/14 | (2009.01) |
| H04W 36/00 | (2009.01) |

(52) U.S. Cl.
CPC ....... *H04W 76/28* (2018.02); *H04W 28/0278* (2013.01); *H04W 76/15* (2018.02); *H04W 28/085* (2013.01); *H04W 36/0069* (2018.08); *H04W 72/14* (2013.01)

(58) Field of Classification Search
None
See application file for complete search history.

(56) References Cited

U.S. PATENT DOCUMENTS

| | | | |
|---|---|---|---|
| 2016/0157265 A1* | 6/2016 | Lee ................... | H04W 72/1284 370/329 |
| 2016/0192433 A1* | 6/2016 | Deenoo .............. | H04W 72/046 370/329 |
| 2016/0285716 A1* | 9/2016 | Pelletier ............... | H04L 5/0098 |
| 2016/0295442 A1* | 10/2016 | Virtej ................ | H04W 72/1284 |
| 2017/0006484 A1* | 1/2017 | Lee ....................... | H04W 76/10 |

FOREIGN PATENT DOCUMENTS

EP  2 835 925  2/2015

* cited by examiner

*Primary Examiner* — Saumit Shah
(74) *Attorney, Agent, or Firm* — The Farrell Law Firm, P.C.

(57) ABSTRACT

A user equipment (UE) configured with an uplink (UL) split bearer and method for packet data convergence protocol (PDCP) control protocol data unit (PDU) transmission by the UE are provided. The method includes triggering, by the UE, a PDCP control PDU; determining, by the UE, whether a UL grant is available for a master evolved node B (eNB); transmitting, by the UE, the PDCP control PDU on a link associated with the master eNB, if the UL grant is available for the master eNB; and transmitting, by the UE, the PDCP control PDU on a link associated with a secondary eNB, when the UL grant is unavailable for the master eNB.

12 Claims, 14 Drawing Sheets

METHOD FOR PDCP CONTROL PDU TRANSMISSION BY USER EQUIPMENT (UE)

PRIORITY

This application claims priority under 35 U.S.C. § 119(a) to Indian Provisional Patent Application Serial No. 4301/CHE/2015 (PS), which was filed in the Indian Intellectual Property Office on Aug. 17, 2015, and to Indian Complete Patent Application Serial No. 4301/CHE/2015 (CS), which was filed in the Indian Intellectual Property Office on Mar. 31, 2016, the entire disclosure of each of which is incorporated herein by reference.

BACKGROUND

An uplink (UL) bearer split is introduced in the Release 13 version of the Long Term Evolution (LTE) standard. In a UL bearer split, a user equipment (UE) is may send its packet data convergence protocol (PDCP) data packets through two different link chains consisting of radio link control (RLC), Medium access control (MAC) and physical layer (PHY) entities, thereby enhancing the UL data rates. The UE receives separate UL allocations or grants on these two UL links and accordingly builds a protocol data unit (PDU) and submits to lower layers for transmission.

The PDCP entities are located in a PDCP sublayer. Several PDCP entities may be defined for the UE. Each PDCP entity carrying the user plane data may be configured to use header compression. Each PDCP entity is carrying the data of one radio bearer. Robust header compression (ROHC) protocol is supported by the PDCP. Every PDCP entity may use at least one ROHC compressor instance and at least one ROHC decompressor instance. The PDCP entity is associated with a control plane or the user plane, depending on which radio bearer it is carrying data for.

The PDCP provides services to a radio resource control (RRC) and user plane upper layers at the UE or to a relay at an evolved node B (eNB). For example, services provided by PDCP to the upper layers may include transfer of user plane data, transfer of control plane data, header compression, ciphering, and integrity protection.

Apart from upper layer data, a PDCP entity also generates a control PDU on its own, which is commonly referred to as a "PDCP control PDU". For example, the PDCP Control PDU is used to convey a PDCP status report, following a PDCP re-establishment, indicating which PDCP service data units (SDUs) are missing and are not header compression control information, e.g., interspersed ROHC feedback.

Buffer status reporting (BSR) for PDCP data packets is transmitted to a master eNB (MeNB) and a secondary eNB (SeNB) based on a threshold approach thereof. The BSR report includes an amount of data buffered for PDCP data packets and is conveyed to an eNB, i.e., either the MeNB or the SeNB, which is preconfigured by network when PDCP data is less than threshold. However, when PDCP data is above the threshold, the BSR is triggered to both eNBs, which is commonly referred to as "a double reporting approach".

However, there are potential issues in the UL split bearer operation for PDCP control PDU transmission.

For example, in dual connectivity (DC) for the UL split bearer operation, there are two possible links to the MeNB and the SeNB, respectively. The BSR and grant allocations on these two links will determine how the PDCP packets are transmitted on these links.

Also, the connection between the SeNB to the MeNB is through a non-ideal backhaul. Therefore, PDCP packets sent to the SeNB are forwarded to the MeNB (where peer PDCP entity resides) through this non-ideal backhaul and experience transfer delay. In this situation, transmission of a PDCP control PDU also suffers.

PDCP Control PDU is critical and any delay in its reception will in turn lead to further delay in processing, transmission, and retransmission of the PDCP packets. For example, a PDCP control PDU may carry status information on the reception status of the packets in order to inform about which packets should be retransmitted. Therefore, if a PDCP control PDU is treated as other data PDUs, delay issues, e.g., a scheduling delay, a backhaul transfer delay, a handover intermission/delay, a discontinuous reception (DRX) wakeup delay, etc., because of a grant allocation or a transfer over the backhaul cannot be avoided.

Thus, there is a need of a simple and robust mechanism for handling the aforementioned issues and reducing delay involved in processing, transmitting, and retransmitting PDCP packets (i.e., PDCP control PDU transmission), thereby increasing the throughput of UE configured with DC.

SUMMARY

An aspect of the present disclosure is to provide a mechanism for PDCP control PDU transmission by a UE configured with a UL split bearer.

Another aspect of the present disclosure is to provide a mechanism for triggering, by a UE, a PDCP control PDU.

Another aspect of the present disclosure is to provide a mechanism for determining, by a UE, whether a UL grant is available for a master eNB.

Another aspect of the present disclosure is to provide a mechanism for transmitting, by a UE, a PDCP Control PDU on one of a link associated with a master eNB, when a UL grant is available for the master eNB, and a link associated with a secondary eNB, when the UL grant is unavailable for the master eNB.

Another aspect of the present disclosure to provide a mechanism for detecting, by a UE, that a PDCP UL data buffered for a bearer exceeds a threshold level.

Another aspect of the present disclosure is to provide a mechanism for transmitting, by a UE, a PDCP Control PDU on a link associated with a master eNB.

Another aspect of the present disclosure is to provide a mechanism for triggering a BSR after one of a handover, a reconfiguration of a PDCP entity, a PDCP data recovery, and reestablishment of a PDCP entity.

Another aspect of the present disclosure is to provide a mechanism for transmitting a PDCP Control PDU on at least one of a link associated with a master eNB, and a link associated with a secondary eNB.

Another object of the embodiments herein is to provide a mechanism for detecting, by a UE, whether a status of a DRX cycle of a link associated with a master eNB is an active state or DRX state.

Another aspect of the present disclosure is to provide a mechanism for transmitting, by a UE, a PDCP Control PDU on a link associated with a master eNB, when an active state (i.e. awake state) of a DRX cycle of the master eNB is detected, and on a link associated with a secondary eNB, when a DRX state (i.e. sleep state) of the master eNB is detected.

Another aspect of the present disclosure is to provide a mechanism for detecting, by a UE, whether a state of a DRX cycle of a link associated with a secondary eNB is an active state or a DRX state.

Another aspect of the present disclosure is to provide a mechanism for transmitting, by a UE, a PDCP Control PDU on a link associated with a secondary eNB, when an active state (i.e. awake state) of a DRX cycle of the secondary eNB is detected, and on a link associated with a master eNB, when a DRX state (i.e. sleep state) of the secondary eNB is detected.

In accordance with an aspect of the present disclosure, a user equipment (UE) configured with an uplink (UL) split bearer for packet data convergence protocol (PDCP) control protocol data unit (PDU) transmission is provided. The UE includes a transmitter configured to transmit data; and a controller configured to control to trigger a PDCP control PDU, determine whether a UL grant is available for a master evolved node B (eNB), transmit the PDCP control PDU on a link associated with the master eNB, when the UL grant is available for the master eNB, and transmit the PDCP control PDU on a link associated with a secondary eNB, when the UL grant is unavailable for the master eNB.

In accordance with another aspect of the present disclosure, a user equipment (UE) configured with an uplink (UL) split bearer for packet data convergence protocol (PDCP) control protocol data unit (PDU) transmission is provided. The UE includes a transmitter configured to transmit data; and a controller configured to control to trigger a buffer status report after one of a handover, reconfiguration of a PDCP entity, a PDCP data recovery, and reestablishment of the PDCP entity, and transmit a PDCP control PDU on at least one of a link associated with the master evolved node B (eNB) and a link associated with the secondary eNB.

In accordance with another aspect of the present disclosure, a method is provided for packet data convergence protocol (PDCP) control protocol data unit (PDU) transmission by a user equipment (UE) configured with an uplink (UL) split bearer. The method includes triggering, by the UE, a PDCP control PDU; determining, by the UE, whether a UL grant is available for a master evolved node B (eNB); transmitting, by the UE, the PDCP control PDU on a link associated with the master eNB, if the UL grant is available for the master eNB; and transmitting, by the UE, the PDCP control PDU on a link associated with a secondary eNB, when the UL grant is unavailable for the master eNB.

BRIEF DESCRIPTION OF FIGURES

The above and other aspects, features, and advantages of certain embodiments of the present disclosure will be more apparent from the following description with reference to the drawings, in which.

DETAILED DESCRIPTION OF EMBODIMENTS OF THE DISCLOSURE

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" refers to "a non-exclusive or", unless otherwise indicated.

The $3^{rd}$ Generation Partnership Project (3GPP) Release 12 proposes DC for increasing UE throughput. The DC to at least two cells may be served by different evolved eNBs, which are linked to each other with a non-ideal backhaul. Further, each of these eNBs may be in charge of a cluster of cells. While the UE is in a DC mode, multiple cells, through the multiple eNBs, may serve the UE thereon, thereby increasing the UE throughput.

Figure 1A:
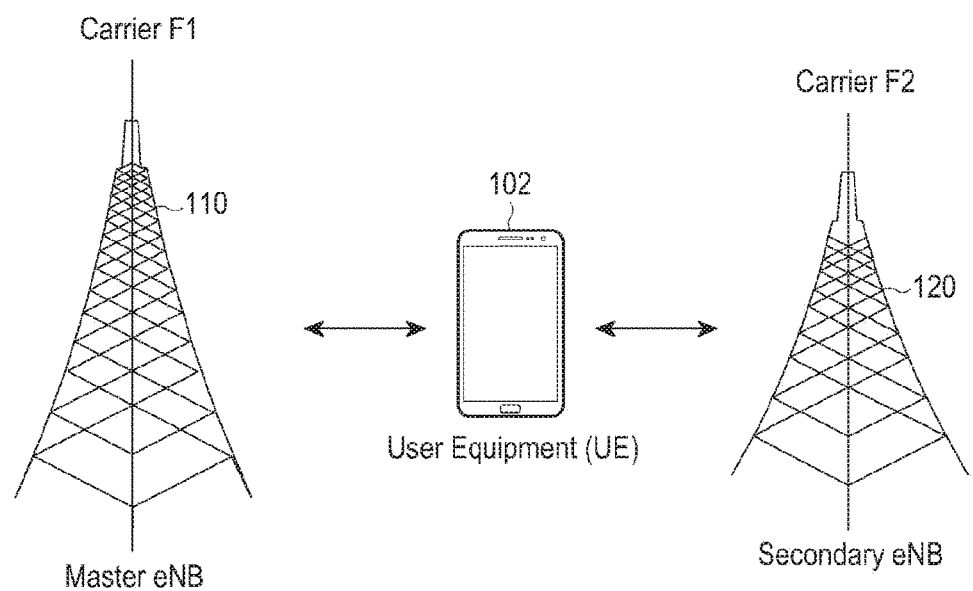
FIG. 1A illustrates a wireless communication network, wherein a UE is configured with a UL split bearer.

FIG. 1A illustrates a wireless communication network, wherein a UE is configured with a UL split bearer, for increasing UE throughput.

Referring to FIG. 1A, an inter-node radio resource aggregation may be established to build a connection of a UE 102 with one or more network nodes, i.e., MeNB 110 and SeNB 120, such that the UE 102 can provide traffic load sharing between the one or more network nodes.

As described above, a PDCP control PDU is important and a delay in its reception will lead to further delay in processing, transmitting, and/or retransmitting PDCP packets, thereby reducing the throughput of UE 102 (configured with DC).

In accordance with an embodiment of the present disclosure, a method is provided for PDCP control PDU transmission by the UE 102 configured with a UL split bearer. The method includes triggering a PDCP control PDU, determining whether a UL grant is available for the master eNB 110, transmitting the PDCP Control PDU on a link associated with the master eNB 110, when the UL grant is available for the master eNB 110, or on a link associated with the secondary eNB 120, when the UL grant is unavailable for the master eNB 110.

For example, the PDCP control PDU includes a PDCP status PDU and ROHC feedback packets.

In accordance with another embodiment of the present disclosure, a method is provided for PDCP control PDU transmission by the UE 102 configured with a UL split bearer. The method includes detecting that a PDCP UL data buffered for a bearer exceeds a threshold level, and transmitting a PDCP Control PDU on a link associated with the master eNB 110.

In accordance with another embodiment of the present disclosure, a method is provided for PDCP control PDU transmission by the UE 102 configured with a UL split bearer. The method includes triggering a BSR after a handover, a reconfiguration of a PDCP entity, a PDCP data recovery, or a reestablishment of a PDCP entity, and transmitting a PDCP Control PDU on at least one of a link associated with the master eNB 110 and a link associated with the secondary eNB 120.

In accordance with another embodiment of the present disclosure, a method is provided for PDCP control PDU transmission by the UE 102 configured with a DC UL split bearer. The method includes triggering a PDCP control PDU, detecting whether a state of a DRX cycle of a link associated with the master eNB 110 is an active state or a DRX state, and transmitting the PDCP Control PDU on a link associated with the master eNB 110, when the active state of the DRX cycle of the master eNB 110 is detected, or on a link associated with the secondary eNB 120, when the DRX state of the master eNB 110 detected.

The UE 102 may also transmit a PDCP Control PDU on a link associated with the secondary eNB 120, when an active state of a DRX cycle of the secondary eNB 120 is detected, and on a link associated with the master eNB 110, when the DRX state of the secondary eNB 120 is detected.

Unlike the conventional systems and methods, the proposed methods provide mechanisms for increasing throughput of the UE 102 configured with the DC, by reducing delay involved in PDCP control PDU transmission (or PDCP control PDU reception). For example, the delay may include a scheduling delay while receiving a grant on one of the links, a backhaul transfer delay, and a handover intermission delay during transmission and reestablishment of PDCP packets.

The proposed mechanisms of the present disclosure provide increased robustness and reliability in transmitting a PDCP control PDU, while reducing delay.

Figure 1B:
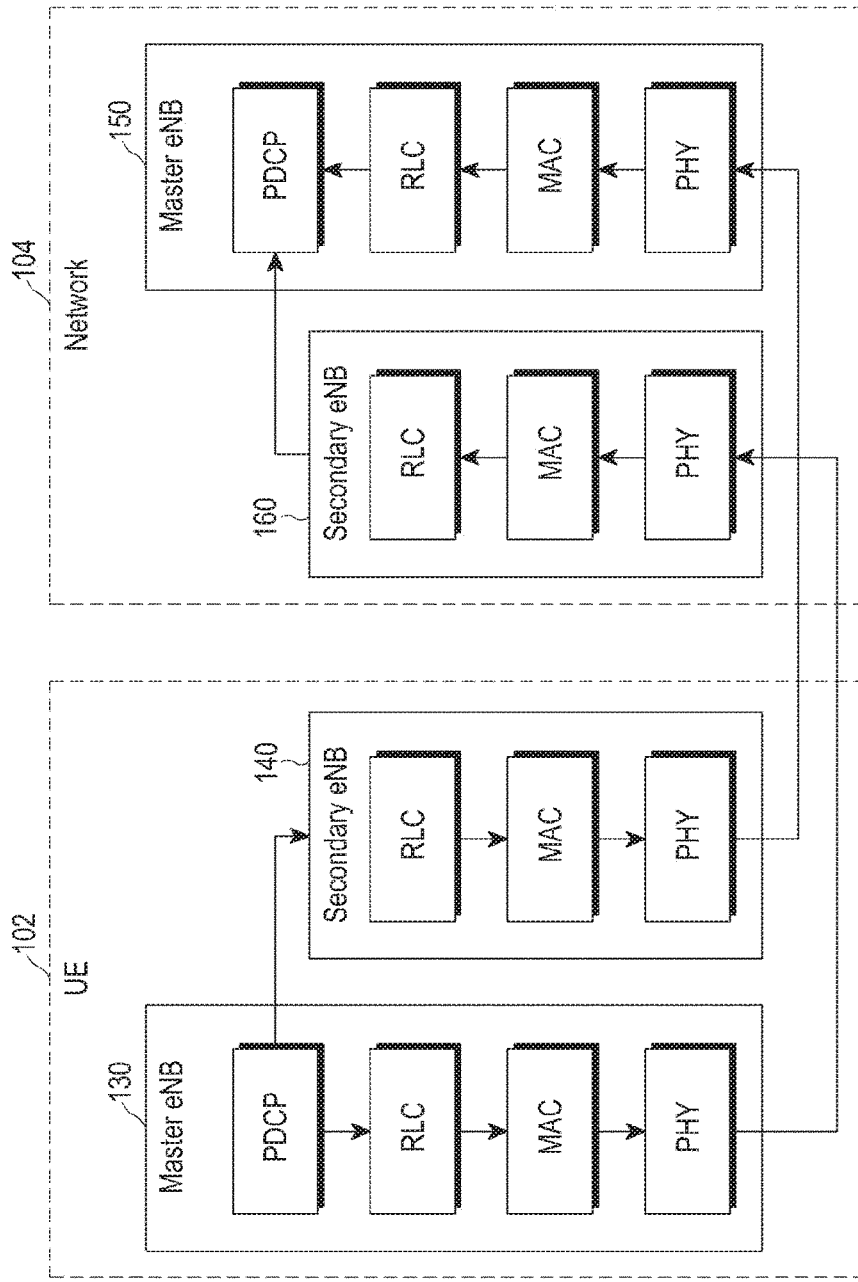
FIG. 1B illustrates a protocol architecture of a UE configured with a UL split bearer.

FIG. 1B illustrates a protocol architecture of a UE configured with a UL split bearer. Specifically, an LTE DC architecture is illustrated in FIG. 1B.

Referring to FIGS. 1A and 1B, aggregated inter-node radio resources consumed by the UE 102 are provided by one or more different network points. The one or more different network points can include, e.g., a Master cell (or Master eNB) and a Secondary cell (or Secondary eNB) connected with a non-ideal backhaul (e.g., a fiber cable, digital subscriber line (DSL), etc.) while in an RRC_connected mode, as illustrated in the FIG. 1A. The one or more nodes include, e.g., the Master eNB (MeNB) 110 and the Secondary eNB (SeNB) 120.

The inter-node radio resource aggregation may be possible when the MeNB 110 and the SeNB 120 are served by different carrier frequencies (F1 and F2). Depending on the technology realization, mobility robustness and increased signaling load may potentially be addressed.

In FIG. 1A, the UE 102 may be a laptop, a desktop computer, a mobile phone, a mobile station, a mobile terminal, a smart phone, a personal digital assistant (PDA), a tablet, a phablet, etc.

Referring to FIG. 1B, the UE 102 configured with a DC UL bearer split is served by two distinct network eNBs (i.e., the MeNB 110 and the SeNB 120), which are connected through the non-ideal backhaul.

According to DC protocol architecture (UL traffic flow), as illustrated in the FIG. 1B, the UE 102 configured with the UL bearer split includes an MeNB 130 stack and a SeNB stack 140. The MeNB 130 stack includes an RLC entity, a Medium Access Control (MAC) entity, a physical layer (PHY) entity, and a PDCP entity. The SeNB stack 140 includes an RLC entity, a MAC entity, and a PHY entity.

Further, a DC protocol network 104 architecture includes a MeNB stack 150 and a SeNB stack 160. The MeNB stack 150 includes an RLC entity, a MAC, a PHY entity, and a PDCP entity. The SeNB stack 160 includes an RLC entity, a MAC entity, and a PHY entity. Thus, the PDCP is a common entity (peer PDCP entity resides) in both the MeNB stack 130 of the UE 102 and the MeNB stack 150 of the network 104.

Further, PDCP control PDU transmission from the MeNB stack 130 of the UE 102 to the PDCP entity of the MeNB stack 150 is performed through the ROHC, the non-ideal backhaul, and the SeNB stack 160. For example, the ROHC can be voice over LTE (VoLTE), which may have to continuously communicate packets (i.e., Internet protocol (IP) packets) between a transmitter and a receiver. For example, the PDCP control PDU includes a PDCP status PDU and ROHC feedback packets.

Due, to the aforementioned DC protocol architecture, there is a delay in transmitting a PDCP control PDU, which affects throughput of the UE 102. For example, the delay includes a scheduling delay, a backhaul transfer delay, and/or a handover intermission delay.

The scheduling delay is incurred due to operation during BSR reporting and during allocation grants between the UE 102 and the network 104 (i.e., two different eNBs). The BSR reporting indicates an amount of data accumulated by the UE 102. In this regard, the network 104 can interpret and allocate a grant through which the UE 102 can transmit a BSR report.

Using the protocol architecture illustrated in FIG. 1B, after a handover is completed, a PDCP status report should be shared with the MeNB 110 to update context information. For example, the context information includes an amount of PDCP packets transmitted, an amount of PDCP packets received, etc. Based on the context information, the MeNB 110 starts transmitting and/or retransmitting PDCP packets. However, due to the limitation of the DC protocol architecture illustrated in FIG. 1B, the PDCP status report is sent through the SeNB 120, which causes a backhaul transfer delay and a handover intermission delay.

Unlike the conventional systems and methods, proposed mechanisms of the present disclosure efficiently addresses the aforementioned delays.

Although embodiments of the present disclosure are described herein with respect to 3GPP and LTE standards, the present disclosure is not limited thereto. For example, the proposed mechanisms may be applicable to a fifth generation (5G) and to one or more SeNBs.

Figure 2:
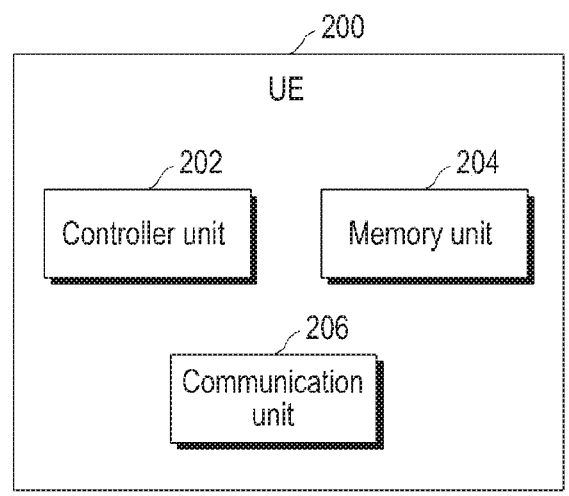
FIG. 2 illustrates a UE configured with a UL split bearer for PDCP control PDU transmission, according to an embodiment of the present disclosure.

FIG. 2 illustrates a UE 102 configured with a DC UL split bearer for PDCP control PDU transmission, according to an embodiment of the present disclosure.

Referring to FIG. 2, the UE 200 includes a controller unit 202, e.g., a hardware processor, the memory unit 204, e.g., a memory device, and a communication unit 206, e.g., a transceiver.

The controller unit 202 may trigger a PDCP control PDU, e.g., a PDCP status PDU and ROHC feedback packets.

The controller unit 202 may determine whether a UL grant is available for transmission to an MeNB. Further, the controller unit 202 may transmit the PDCP Control PDU on a link associated with an MeNB, when the UL grant is available for the MeNB, or on a link associated with a secondary eNB, when the UL grant is unavailable for the master eNB. Unlike the conventional methods described above in conjunction with the FIGS. 1A and 1B, if the controller 202 determines that a link associated with an MeNB is available, a triggered BSR report may be sent to the MeNB, where the MeNB can overcome handover intermission without any delay.

Further, the controller unit 202 may detect that PDCP UL data buffered for a bearer exceeds a threshold level.

The controller unit 202 may transmit a PDCP Control PDU on a link associated with a MeNB.

Further, the controller unit 202 may trigger a BSR to the MeNB, after a handover to a master eNB or a reestablishment of a PDCP entity.

Further, the controller unit 202 may transmit a PDCP Control PDU on at least one of a link associated with an MeNB, and a link associated with an SeNB.

The controller unit 202 may trigger a PDCP control PDU.

The controller unit 202 may detect whether a state of a DRX cycle of a link associated with an MeNB, is an active state or a DRX state.

The controller unit 202 may transmit a PDCP Control PDU on a link associated with an MeNB, when an active state of a DRX cycle of the MeNB is detected, or on a link associated with an SeNB, when a DRX state of the DRX cycle of the MeNB is detected.

The controller unit 202 may transmit a PDCP Control PDU on a link associated with an SeNB, when an active state of a DRX cycle of the SeNB is detected, or on a link associated with an MeNB, when a DRX state of the DRX cycle of the SeNB is detected.

Different treatment may be applied to a PDCP control PDU based on its type, e.g., whether it is the PDCP status report or a ROHC feedback packet, when selecting of a link in dual connectivity for transmission.

The selection of a link for PDCP Control PDU transmission may be based on a DRX activity status of respective links.

An MeNB may provide periodic or regular allocation grants to the UE 200, so that the UE 200 can schedule and transmit PDCP Control PDUs. Further, a method for sending PDCP control PDUs by selecting one of the two links in dual connectivity scenario is described next.

A criterion for selecting a link may be whether a link has better signal strength, has a larger uplink grant size, has faster transmission, has less backhaul delay, has less scheduling delay, is experiencing less retransmissions or discard situations (e.g., when a discard timer expiries) or has been configured by the network as the default link. Criterion may also be based on a size of accumulated uplink buffer compared to a network configured threshold.

The storage unit 204 may include one or more computer-readable storage media. The memory unit 204 may also include non-volatile storage elements, such as magnetic hard discs, optical discs, floppy discs, flash memories, or forms of electrically programmable memories (EPROM) or electrically erasable and programmable (EEPROM) memories.

In addition, the memory unit 204 may be considered a non-transitory storage medium, which may store data that can, over time, change (e.g., in Random Access Memory (RAM) or cache). Herein, the term "non-transitory" may indicate that the storage medium is not embodied in a carrier wave or a propagated signal, but should not be interpreted that the memory unit 204 is non-movable.

The memory unit 204 may be configured to store larger amounts of information. The communication unit 206 may communicate internally between units of the UE 200 and externally, e.g., with the networks.

The UE 200 can autonomously switch a link to trigger PDCP control PDU transmission, while a link configured by any one of an MeNB and an SeNB 120 is experiencing failure of uplink time alignment, radio link failure, or handover failure, or is out of sync or experiencing poor signal conditions, thereby reducing delay that would otherwise be incurred in regaining synchronization and then triggering, by the UE 200, a PDCP control PDU.

The UE 200 may avoid a grant (i.e., the UL grant) with a size that leads to possible segmentation of a control PDU or is insufficient to accommodate a complete PDCP control PDU. It may not be possible to break a PDCP Control PDU. Further, when a PDCP Control PDU is segmented to be accommodated in an available grant size, information conveyed to the peer PDCP entity may not be complete, which causes ambiguity about a status of a sending PDCP entity.

While FIG. 2 illustrates certain units of the UE 200, the present disclosure is not limited thereto. For example, the UE 200 may include fewer or more units. Additionally, the labels and/or names of the units of the UE 200 are provided only for illustrative purpose and do not limit the scope of the embodiment. For example, one or more units can be combined together to perform same or substantially similar function in the UE 200.

Figure 3:
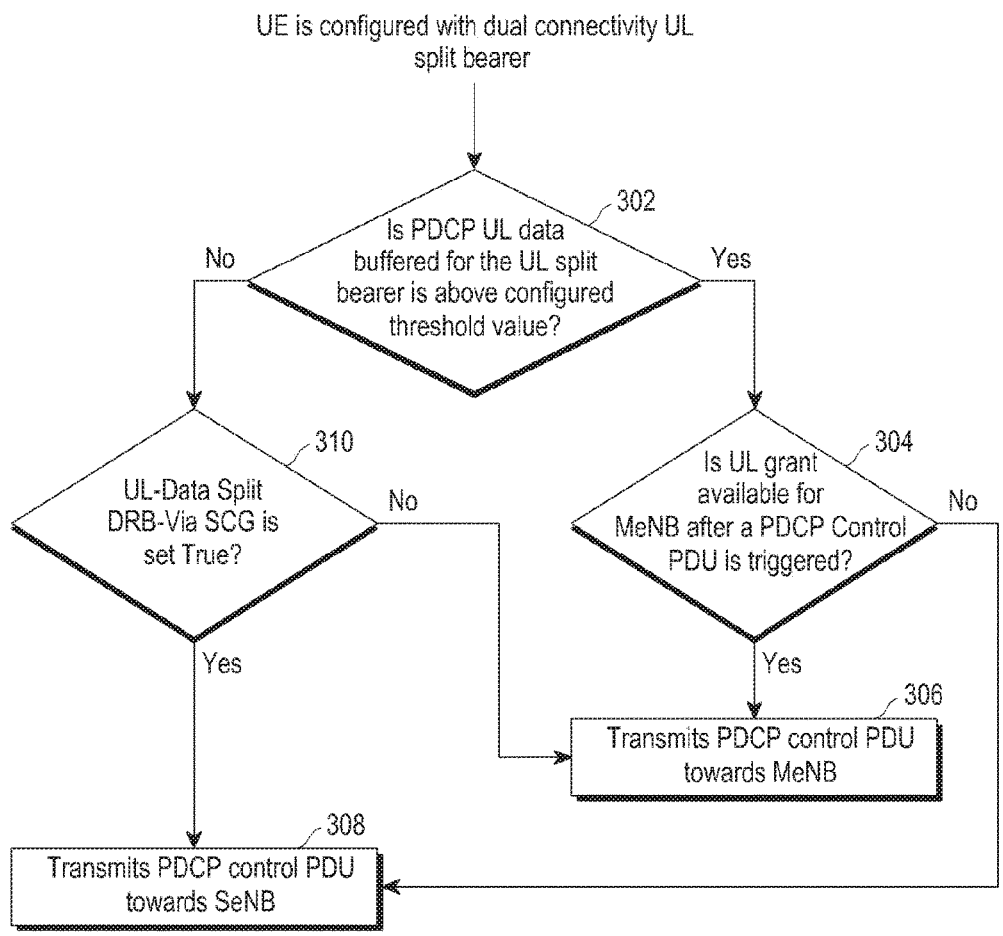
FIG. 3 is a flow diagram illustrating a method for PDCP control PDU transmission by a UE configured with a UL split bearer, based on a UL split bearer threshold value and an availability of a UL grant, according to an embodiment of the present disclosure.

FIG. 3 is a flow diagram illustrating a method for PDCP control PDU transmission by a UE configured with a UL split bearer, based on a threshold UL grant, according to an embodiment of the present disclosure.

Referring to FIG. 3, in step 302, the UE determines whether PDCP UL data buffered for the UL split bearer is greater than a threshold value. The configured threshold value may be set by the network(s). For example, in the UE 200 as illustrated in FIG. 2, the controller unit 202 determines whether the PDCP UL data buffered for the UL split bearer is greater than the threshold value.

If the PDCP UL data buffered for the UL split bearer is greater than the threshold value in step 302, the UE determines whether a UL grant is available for an MeNB, after the PDCP control PDU is triggered, in step 304. For example, in the UE 200 as illustrated in FIG. 2, the controller unit 202 determines whether the UL grant is available for an MeNB, after the PDCP control PDU is triggered.

If the UL grant is available for the MeNB in step 304, the UE transmits a PDCP control PDU to a link associated with the MeNB in step 306. For example, in the UE 200 as illustrated in FIG. 2, the controller unit 202 transmits the PDCP control PDU to the link associated with the MeNB.

If the UL grant is unavailable for the MeNB in step 304, the UE transmits a PDCP control PDU to a link associated with an SeNB in step 308. For example, in the UE 200 as illustrated in FIG. 2, the controller unit 202 transmits the PDCP control PDU to the link associated with the SeNB.

If the PDCP UL data buffered for the UL split bearer is less than the threshold value in step 302, the UE determines whether an UL-data split data radio bearer (DRB)—via a secondary cell group (SCG) is configured as true. For example, in the UE 200 as illustrated in FIG. 2, the controller unit 202 determines whether the PDCP control PDU indicated by the UL-Data Split DRB-ViaSCG is true.

If the UL-Data Split DRB-ViaSCG indication is true in step 310, the UE transmits a PDCP Control PDU to a link associated with the SeNB. For example, in the UE 200 as illustrated in FIG. 2, the controller unit 202 transmits the PDCP control PDU to the link associated with the SeNB.

If the UL-Data Split DRB-ViaSCG indication is not true in step 310, the UE transmits the PDCP Control PDU to the link associated with the MeNB. For example, in the UE 200 as illustrated in FIG. 2, the controller unit 202 transmits the PDCP Control PDU to the link associated with the MeNB, if the indication is not true.

The various actions, acts, blocks, steps, etc., as illustrated in FIG. 3 may be performed in the order presented, in a different order, or simultaneously. Further, in some embodiments, some of the actions, acts, blocks, steps, etc., may be omitted, added, modified, skipped, etc., without departing from the scope of the disclosure.

Figure 4:
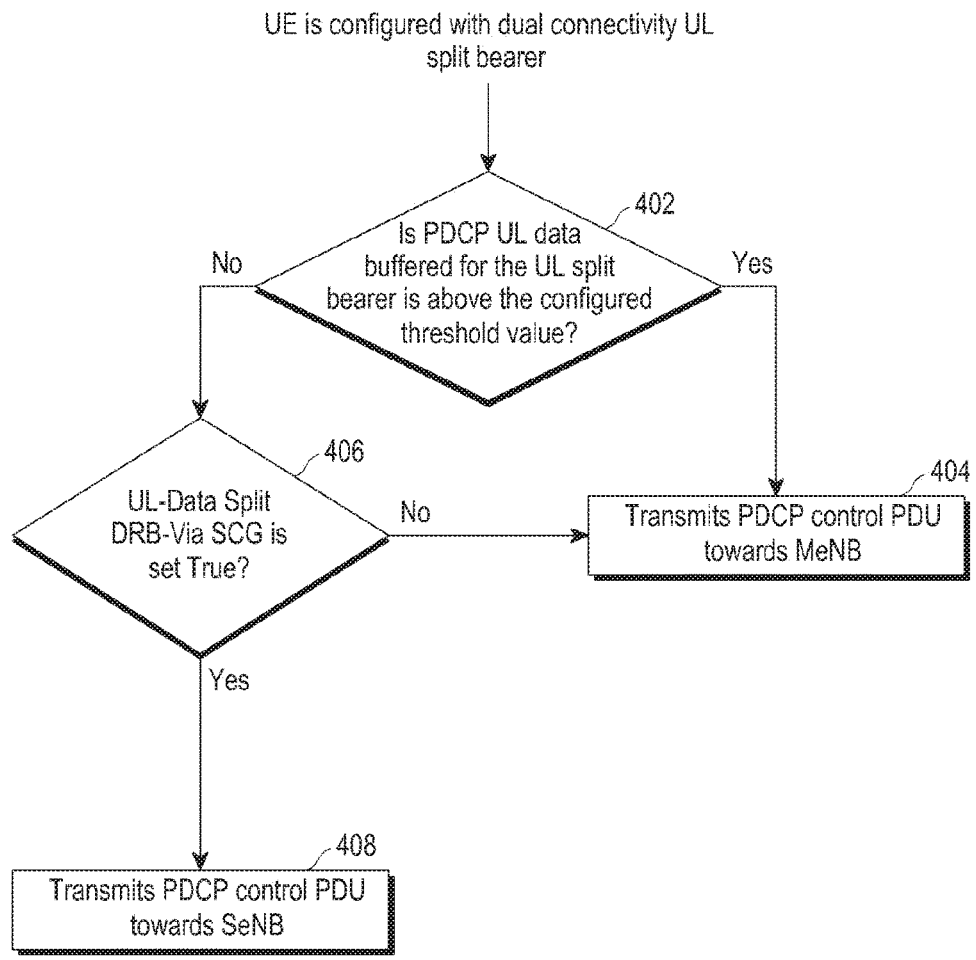
FIG. 4 is a flow diagram illustrating a method for PDCP control PDU transmission by a UE configured with a UL split bearer, based on a UL split bearer threshold value, according to an embodiment of the present disclosure.

FIG. 4 is a flow diagram illustrating a method for PDCP control PDU transmission by a UE configured with a UL split bearer, based on a UL split bearer threshold value, according to an embodiment of the present disclosure.

Referring to FIG. 4, in step 402, the UE determines whether PDCP UL data buffered for the UL split bearer is greater than a threshold value.

If the determined PDCP UL data buffered for the UL split bearer is greater than threshold value in step 402, the UE transmits a PDCP control PDU to a link associated with an MeNB in step 404.

However, if the determined PDCP UL data buffered for the UL split bearer is below the threshold value in step 402, the UE determines whether a PDCP control PDU indicated by a UL-Data Split DRB-ViaSCG is true in step 406.

If the PDCP control PDU indicated by the UL-Data Split DRB-ViaSCG is true in step 406, the UE transmits the PDCP control PDU to a link associated with an SeNB in step 408.

However, if the PDCP control PDU indicated by the UL-Data Split DRB-ViaSCG is not true in step 406, the UE transmits the PDCP control PDU to the link associated with the MeNB in step 404.

In FIG. 4, the PDCP Control PDU is transmitted to the link indicated by the UL split bearer (e.g., a ul-DataSplit-DRB-ViaSCG-r12) when the PDCP data amount is less than the threshold value. However, when the PDCP data amount is greater than the threshold value, the PDCP control PDU is transmitted to the link associated with the MeNB. Accordingly, the PDCP Control PDU may be transmitted to the link where the UE receives an uplink grant, i.e., based on the UL-Data SplitDRB-ViaSCG value, after the PDCP control PDU is triggered or generated, irrespective of whether the PDCP data amount accumulated in the buffer is below or above the threshold.

The various actions, acts, blocks, steps, etc., as illustrated in FIG. 4 may be performed in the order presented, in a different order, or simultaneously. Further, in some embodiments, some of the actions, acts, blocks, steps, etc., may be omitted, added, modified, skipped, etc., without departing from the scope of the disclosure.

Figure 5:
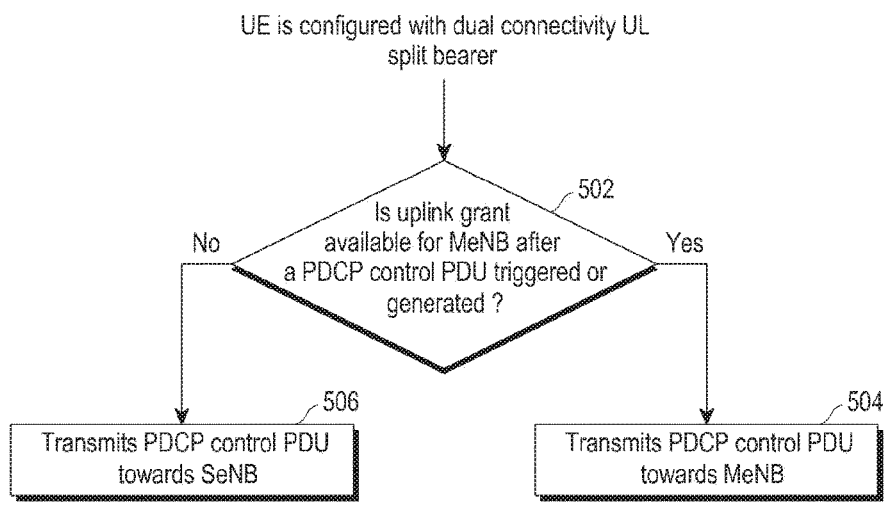
FIG. 5 is a flow diagram illustrating a method for PDCP control PDU transmission by a UE configured with a UL split bearer, based on UL grant availability, according to an embodiment of the present disclosure.

FIG. 5 is a flow diagram illustrating a method for PDCP control PDU transmission by a UE configured with a UL split bearer, based on a UL grant availability, according to an embodiment of the present disclosure.

Referring to FIG. 5, in step 502, the UE determines whether a UL grant is available for an MeNB, after a PDCP control PDU is triggered.

If the UL grant is available for the MeNB in step 502, the UE transmits a PDCP control PDU to a link associated with the MeNB in step 504.

If the UL grant is unavailable for the MeNB in step 502, the UE transmits a PDCP control PDU to a link associated with an SeNB in step 506.

In FIG. 5, a PDCP Control PDU is transmitted to a link where the UE receives an uplink grant, after the PDCP control PDU is triggered, irrespective of an amount of PDCP data amount accumulated.

The various actions, acts, blocks, steps, etc., as illustrated in FIG. 5 may be performed in the order presented, in a different order, or simultaneously. Further, in some embodiments, some of the actions, acts, blocks, steps, etc., may be omitted, added, modified, skipped, etc., without departing from the scope of the disclosure.

Figure 6:
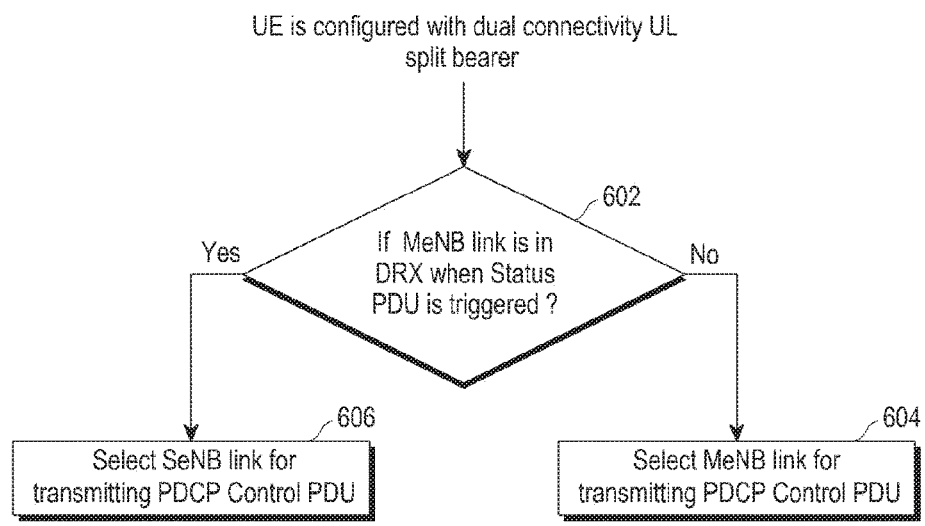
FIG. 6 is a flow diagram illustrating a method for PDCP control PDU transmission by a UE configured with a UL split bearer, based on a status of DRX at an MeNB, according to an embodiment of the present disclosure.

FIG. 6 is a flow diagram illustrating a method for PDCP control PDU transmission by a UE configured with a UL split bearer based on a state of a DRX, according to an embodiment of the present disclosure.

Referring to FIG. 6, in step 602, the UE determines whether a link associated with an MeNB is in a DRX active state when a status PDU is triggered.

If the link associated with the MeNB is in the DRX active state in step 602, the UE transmits a PDCP control PDU to a link associated with the MeNB in step 604.

However, if the link associated with the MeNB is in a DRX inactive (sleep) state in step 602, the UE transmits a PDCP control PDU to a link associated with an SeNB in step 606.

In FIG. 6, the selection of a link for PDCP Control PDU transmission is based on the DRX activity status of the respective links. For example, if one of the links is in a DRX state, the UE 102 selects the other link which is in active (for e.g., awake) state for triggering a BSR report and transmission of a PDCP control PDU.

When the UL grant is received on both a link associated with the MeNB and a link associated with the SeNB (i.e., a same transmission time interval (TTI) grant) in a same sub-frame, the UE may trigger a PDCP control PDU to the link associated with the MeNB, in order to reduce a backhaul transfer delay between the SeNB and the MeNB in providing the PDCP Control PDU.

The MeNB may provide periodic or regular grant allocation to the UE so that the UE can schedule and transmit PDCP Control PDUs. Further, a method for sending PDCP control PDUs by selecting one of the two links in dual connectivity scenario is described next.

A criterion for selecting a link which is considered better may include a link that has better signal strength, has a larger uplink grant size, a faster transmission, less backhaul delay, less scheduling delay, or is experiencing less retransmissions or discard situations. The various actions, acts, blocks, steps, etc., as illustrated in FIG. 6 may be performed in the order presented, in a different order, or simultaneously. Further, in some embodiments, some of the actions, acts, blocks, steps, etc., may be omitted, added, modified, skipped, etc., without departing from the scope of the disclosure.

Figure 7:
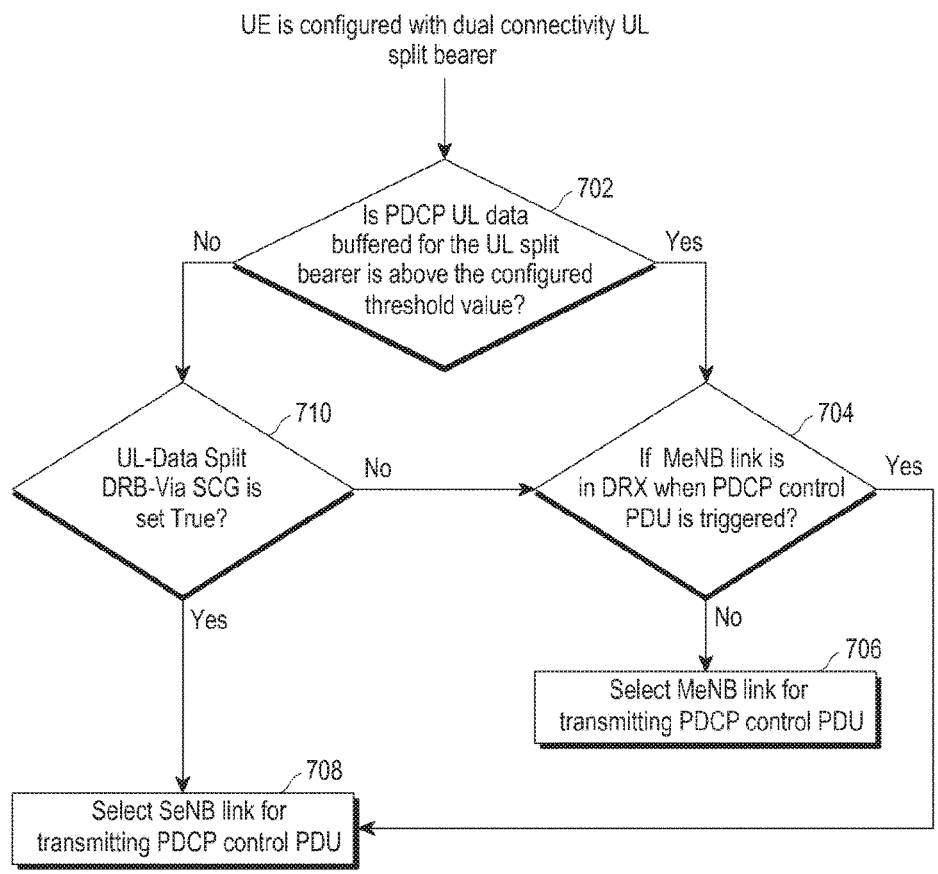
FIG. 7 is a flow diagram illustrating a method for PDCP control PDU transmission by a UE configured with a UL split bearer, based on a status of a UL split bearer threshold value and DRX, according to an embodiment of the present disclosure.

FIG. 7 is a flow diagram illustrating a method for PDCP control PDU transmission by a UE based on a state of DRX and a threshold UL grant, according to an embodiment of the present disclosure.

Referring to FIG. 7, in step 702, the UE determines whether PDCP UL data buffered for the UL split bearer is greater than a threshold value.

If the PDCP UL data buffered for the UL split bearer is greater than a threshold value in step 702, the UE determines whether a link associated with an MeNB is in an active state (i.e. awake state) of DRX cycle, when PDCP control PDU is triggered, in step 704.

If the link associated with the MeNB is in the active state (i.e. awake state) in step 704, the UE selects a link associated with the MeNB for transmitting a PDCP control PDU.

If the link associated with the MeNB is not in the active state, i.e., is in the DRX state, in step 704, the UE selects a link associated with an SeNB for transmitting a PDCP control PDU in step 708.

If the PDCP UL data buffered for the UL split bearer is not greater than the threshold value in step 702, the UE determines whether a PDCP control PDU indicated by a UL-Data Split DRB-ViaSCG is set to true in step 710.

If the UL-Data Split DRB-Via SCG indication is true in step 710, the UE transmits the PDCP control PDU to the link associated with the SeNB in step 708.

However, if the UL-Data Split DRB-ViaSCG indication is not true in step 710, the UE determines whether the link associated with the MeNB is in the active DRX state, when PDCP control PDU is triggered, in step 704.

The various actions, acts, blocks, steps, etc., as illustrated in FIG. 7 may be performed in the order presented, in a different order, or simultaneously. Further, in some embodiments, some of the actions, acts, blocks, steps, etc., may be omitted, added, modified, skipped, etc., without departing from the scope of the disclosure.

Figure 8:
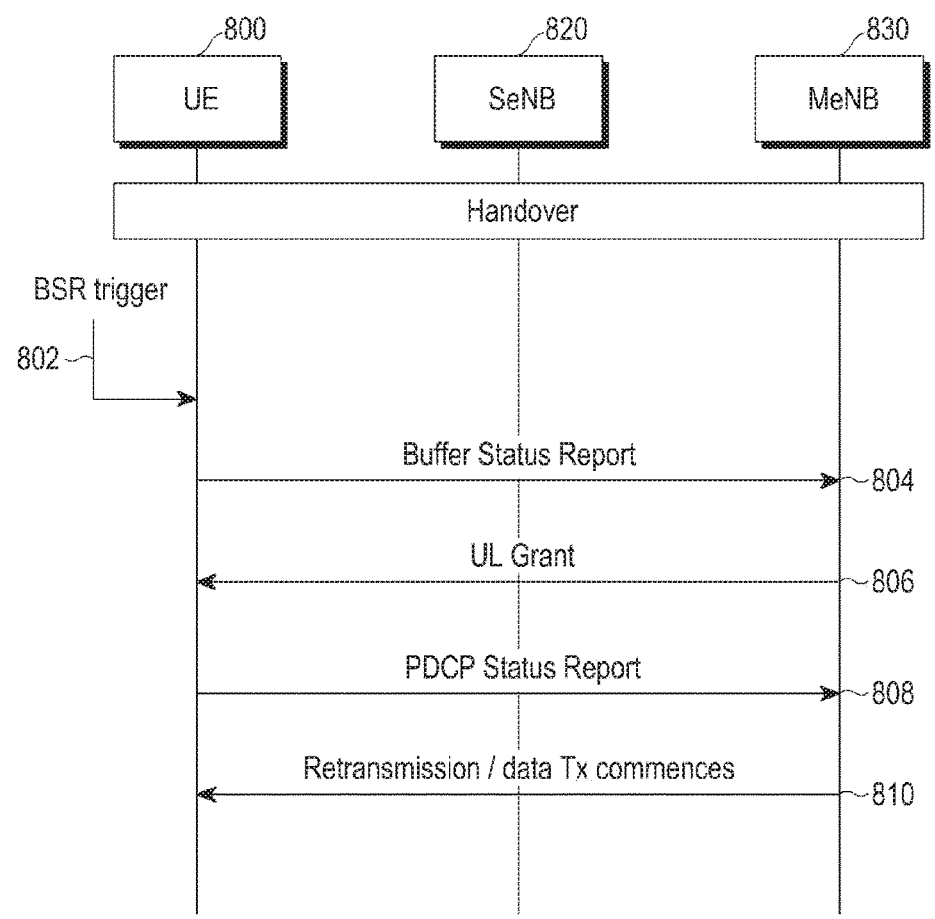
FIG. 8 is a signal flow diagram illustrating a method for PDCP control PDU transmission by a UE configured with a UL split bearer, according to an embodiment of the present disclosure.

FIG. 8 is a signal flow diagram illustrating a method for PDCP control PDU transmission by a UE configured with a UL split bearer, according to an embodiment of the present disclosure.

Referring to FIG. 8, in step 802, BSR is triggered in a UE 800, after a handover. Alternatively, the BSR may be triggered after a reconfiguration of the PDCP entity, PDCP data recovery, or reestablishment of the PDCP entity takes place.

In step 804, the UE 800 send a buffer status report to an MeNB 830, which enables the earliest possible UL grant availability on the MeNB 830 link in step 806.

Thereafter, the UE 800 transmits a PDCP status report to the MeNB 830 link, irrespective of a buffer threshold level, in step 808.

In step 810, the MeNB 830, upon the receipt of the PDCP status report, establishes a retransmission or data transmission (Tx) commences, thus reducing handover intermission delay.

In another embodiment, the uplink grant allocation may be provided autonomously by the MeNB 830 in scenarios of a handover, a reconfiguration, or a reestablishment of a PDCP entity that implies no explicit BSR reporting is to be undertaken by the UE 800.

A PDCP control PDU may transmitted to both links in the scenarios of handover, reconfiguration of the PDCP entity, the PDCP data recovery, and the reestablishment of the PDCP entity. A receiving entity can discard a duplicate PDCP control PDU when received.

Figure 9:
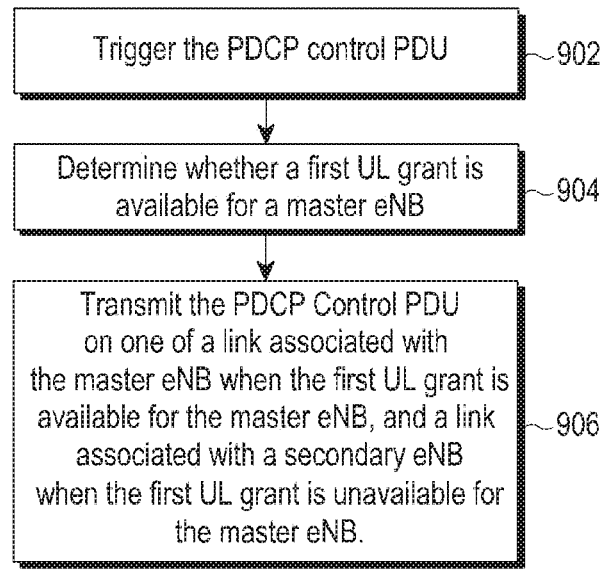
FIG. 9 is a flow diagram illustrating a method for PDCP control PDU transmission by a UE configured with a UL split bearer, according to an embodiment of the present disclosure.

FIG. 9 is a flow diagram illustrating a method for PDCP control PDU transmission by a UE configured with a UL split bearer, according to an embodiment of the present disclosure.

Referring to FIG. 9, in step 902, the UE triggers a PDCP control PDU.

In step 904, the UE determines whether an UL grant is available for an MeNB.

In step 906, the UE transmits a PDCP control PDU on a link associated with the MeNB, when the UL grant is available for the MeNB, or on a link associated with an SeNB, when the UL grant is unavailable for the MeNB.

The various actions, acts, blocks, steps, etc., as illustrated in FIG. 9 may be performed in the order presented, in a different order, or simultaneously. Further, in some embodiments, some of the actions, acts, blocks, steps, etc., may be omitted, added, modified, skipped, etc., without departing from the scope of the disclosure.

Figure 10:
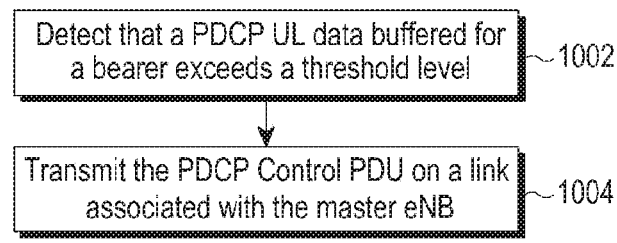
FIG. 10 is a flow diagram illustrating a method for PDCP control PDU transmission by a UE configured with an Uplink (UL) split bearer, according to an embodiment of the present disclosure.

FIG. 10 is a flow diagram illustrating a method for PDCP control PDU transmission by a UE configured with a UL split bearer, according to an embodiment of the present disclosure.

Referring to FIG. 10, in step 1002, the UE detects that PDCP UL data buffered for a bearer exceeds a threshold level.

In step 1004, the UE transmits a PDCP control PDU on a link associated with an MeNB.

The various actions, acts, blocks, steps, etc., as illustrated in FIG. 10 may be performed in the order presented, in a different order, or simultaneously. Further, in some embodiments, some of the actions, acts, blocks, steps, etc., may be omitted, added, modified, skipped, etc., without departing from the scope of the disclosure.

Figure 11:
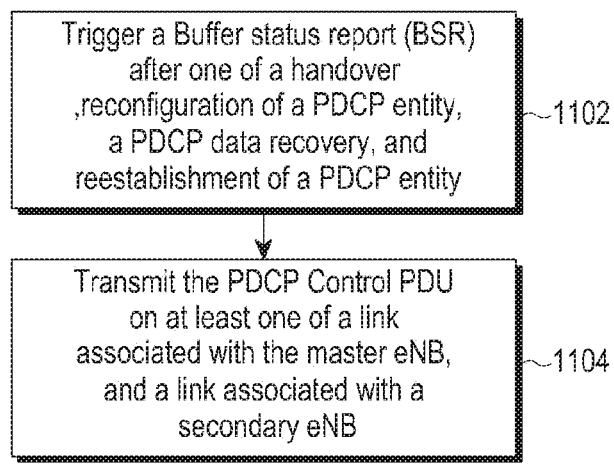
FIG. 11 is a flow diagram illustrating a method for PDCP control PDU transmission by a UE configured with a UL split bearer, according to an embodiment of the present disclosure.

FIG. 11 is a flow diagram illustrating a method for PDCP control PDU transmission by a UE configured with a UL split bearer, according to an embodiment of the present disclosure.

Referring to FIG. 11, in step 1102, the UE triggers a BSR after a handover, reconfiguration of a PDCP entity, a PDCP data recovery, or reestablishment of a PDCP entity.

In step 1104, the UE transmits a PDCP Control PDU on at least one of a link associated with an MeNB and a link associated with an SeNB.

The various actions, acts, blocks, steps, etc., as illustrated in FIG. 11 may be performed in the order presented, in a different order, or simultaneously. Further, in some embodiments, some of the actions, acts, blocks, steps, etc., may be omitted, added, modified, skipped, etc., without departing from the scope of the disclosure FIG. 12 is a flow diagram illustrating a method for PDCP control PDU transmission by a UE configured with a UL split bearer, according to an embodiment of the present disclosure.

Figure 12:
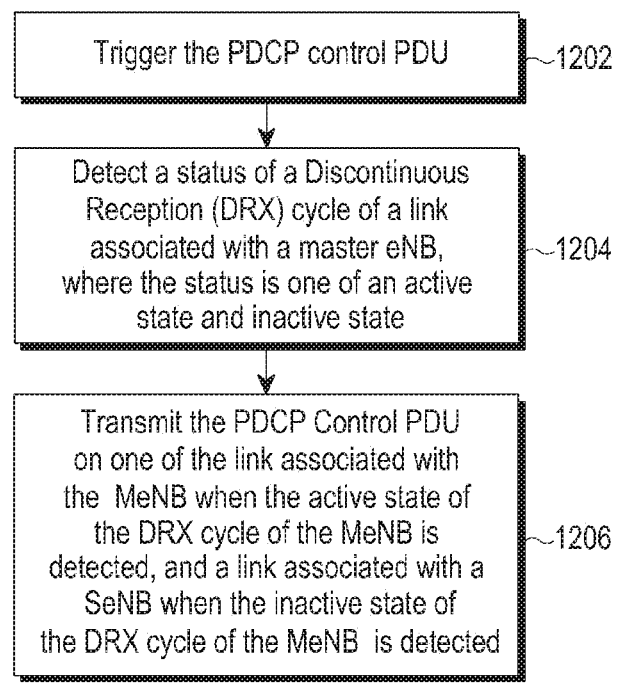
FIG. 12 is a flow diagram illustrating a method for PDCP control PDU transmission by a UE configured with a UL split bearer, according to an embodiment of the present disclosure.

Referring to FIG. 12, in step 1202, the UE triggers a PDCP control PDU.

In step 1204, the UE detects a state of a DRX cycle of a link associated with an MeNB as being in an active state or a DRX state.

In step 1206, the UE transmits a PDCP Control PDU on the link associated with the MeNB, when the active state of the DRX cycle of the MeNB is detected, or on a link associated with an SeNB, when the DRX state of the MeNB is detected.

The various actions, acts, blocks, steps, etc., as illustrated in FIG. 12 may be performed in the order presented, in a different order, or simultaneously. Further, in some embodiments, some of the actions, acts, blocks, steps, etc., may be omitted, added, modified, skipped, etc., without departing from the scope of the disclosure.

Figure 13:
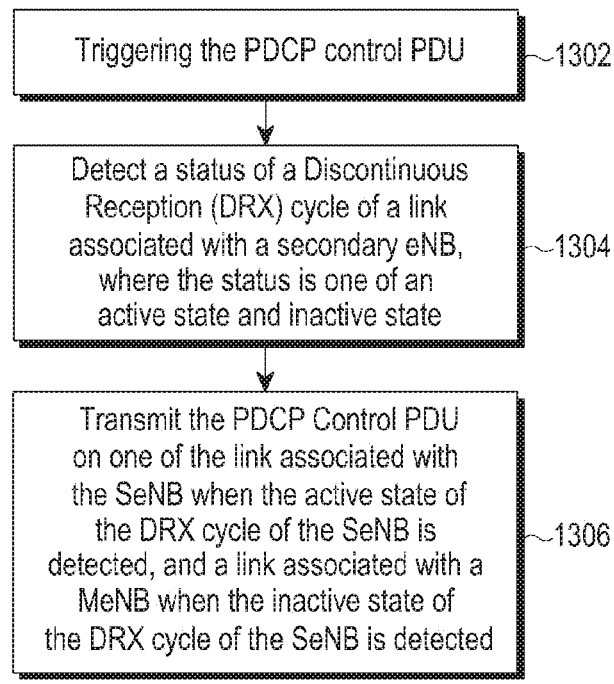
FIG. 13 is a flow diagram illustrating a method for PDCP control PDU transmission by a UE configured with a UL split bearer, based on a status of DRX at an SeNB, according to an embodiment of the present disclosure.

FIG. 13 is a flow diagram illustrating a method for PDCP control PDU transmission by a UE configured with a UL split bearer, according to an embodiment of the present disclosure.

Referring to FIG. 13, in step 1302, the UE triggers a PDCP control PDU.

In step 1304, the UE detects a state of a DRX cycle of a link associated with an SeNB 120 as being in an active state or a DRX state.

In step 1306, the UE transmits a PDCP control PDU on the link associated with the SeNB, when the active state of the DRX cycle of the SeNB is detected, or on a link associated with an MeNB, when the DRX state of the SeNB is detected.

The various actions, acts, blocks, steps, etc., as illustrated in FIG. 13 may be performed in the order presented, in a different order, or simultaneously. Further, in some embodiments, some of the actions, acts, blocks, steps, etc., may be omitted, added, modified, skipped, etc., without departing from the scope of the disclosure.

For example, a UE may select a reliable link for transmitting a PDCP control PDU, based on a criterion associated with one of the two links in dual connectivity scenario. The criterion may include whether a link has better signal strength, has a larger uplink grant size, is experiencing less retransmissions, is experiencing less discard situations, or avoiding segmentation of Control PDU. If a link associated with an MeNB satisfies one or more factors, as described above, the UE can a PDCP control PDU to the link associated with the MeNB.

Figure 14:
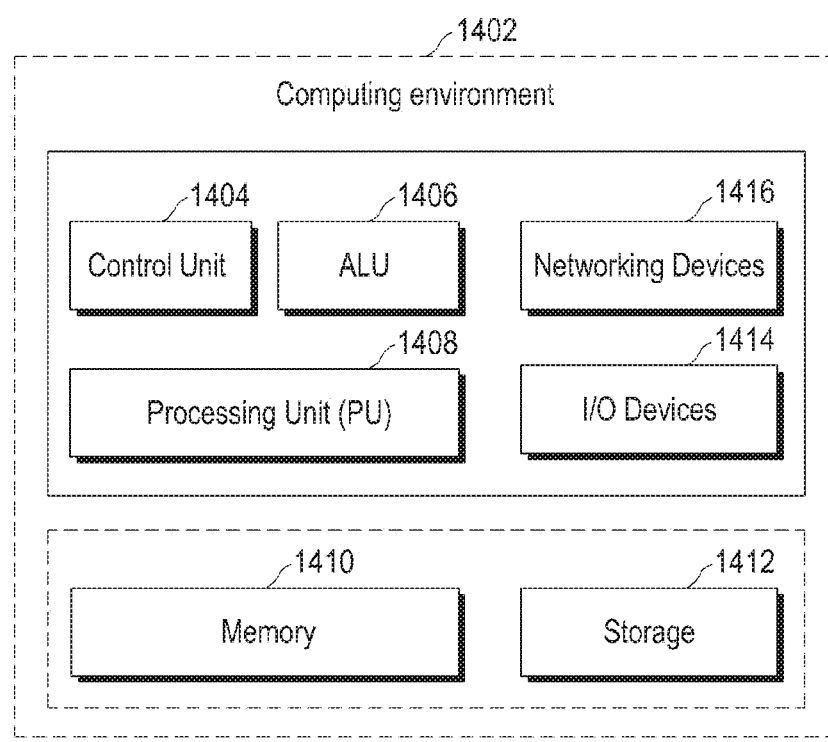
FIG. 14 illustrates a computing environment capable of implementing a method for PDCP control PDU transmission by a UE configured with a UL split bearer, according to an embodiment of the present disclosure.

FIG. 14 a computing environment for implementing a method for PDCP control PDU transmission by a UE configured with a UL split bearer, according to an embodiment of the present disclosure.

Referring to FIG. 14, the computing environment 1402 includes a processing unit 1408 that communicates with a control unit 1404 and an arithmetic logic unit (ALU) 1406, a memory 1410, a storage unit 1412, plurality of networking devices 1416, and a plurality Input output (I/O) devices 1414. The processing unit 1408 is responsible for processing instructions. The processing unit 1408 may receive commands from the control unit 1404 in order to perform processing. Further, logical and arithmetic operations involved in the execution of the instructions may be computed using the ALU 1406.

The overall computing environment 1402 can be composed of multiple homogeneous or heterogeneous cores, multiple CPUs of different kinds, special media and other accelerators. The processing unit 1408 may be included with a plurality of processing units on a single chip or over multiple chips.

Schemes comprising instructions and codes for the implementation thereof are stored in the memory unit 1410 and/or the storage 1412. At the time of execution, the instructions may be fetched from the corresponding memory 1410 and/or storage 1412, and executed by the processing unit 1408.

In case of any hardware implementations, various networking devices 1416 or external I/O devices 1414 may be connected to the computing environment to support the implementation through the networking unit and the I/O device unit.

The embodiments disclosed herein can be implemented through at least one software program running on at least one hardware device and performing network management functions to control the elements. For example, the elements illustrated in FIGS. 1 to 14 include blocks, which can be at least one of a hardware device, or a combination of hardware device and software units.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A user equipment (UE) to transmit data, the UE comprising:
a memory unit configured to buffer a packet data convergence protocol (PDCP) control protocol data unit (PDU) to transmit through an uplink (UL) split bearer;
a controller configured to control to trigger the PDCP control PDU, and determine whether a UL grant is available for a master evolved node B (eNB); and
a transceiver configured to:
in response to the UL grant being available for the master eNB, transmit the PDCP control PDU on a link associated with the master eNB; and
in response to the UL grant being unavailable for the master eNB, transmit the PDCP control PDU on a link associated with a secondary eNB,
wherein the PDCP control PDU is triggered when PDCP UL data buffered for the UL split bearer exceeds a threshold level, and
wherein the controller is further configured to detect whether a state of a discontinuous reception (DRX) cycle of the link associated with the master eNB is in one of an active state and a DRX state, and control the transceiver to transmit the PDCP control PDU, based on the detected state of the DRX cycle.

2. The UE of claim 1, wherein the controller is further configured to control the transceiver to transmit the PDCP control PDU on the link associated with the master eNB, when the active state of the DRX cycle of the link associated with the master eNB is detected.

3. The UE of claim 1, wherein the controller is further configured to control the transceiver to transmit the PDCP control PDU on the link associated with the secondary eNB, when the DRX state of the link associated with the master eNB is detected.

4. The UE of claim 1, wherein the controller is further configured to detect whether a state of a discontinuous reception (DRX) cycle of the link associated with the secondary eNB is in one of an active state and a DRX state, and control the transceiver to transmit the PDCP control PDU, based on the detected state of the DRX cycle.

5. The UE of claim 4, wherein the controller is further configured to control the transceiver to transmit the PDCP control PDU on the link associated with the secondary eNB, when the active state of the DRX cycle of the link associated with the secondary eNB is detected.

6. The UE of claim 4, wherein the controller is further configured to control the transceiver to transmit the PDCP control PDU on the link associated with the master eNB, when the DRX state of the link associated with the secondary eNB is detected.

7. A method to transmit data by a user equipment (UE) configured with an uplink (UL) split bearer, the method comprising:
   triggering a packet data convergence protocol (PDCP) control protocol data unit (PDU) to transmit through an uplink (UL) split bearer;
   determining whether a UL grant is available for a master evolved node B (eNB);
   in response to the UL grant is available for the master eNB, transmitting the PDCP control PDU on a link associated with the master eNB; and
   in response to the UL grant being unavailable for the master eNB, transmitting, by the UE, the PDCP control PDU on a link associated with a secondary eNB,
   wherein the PDCP control PDU is triggered when PDCP UL data buffered for UL spilt bearer exceeds a threshold level, and
   wherein the transmitting the PDCP control PDU on the link associated with the master eNB, comprises:
   detecting whether a state of a discontinuous reception (DRX) cycle of the link associated with the master eNB is in one of an active state and a DRX state; and
   transmitting the PDCP control PDU, based on the detected state of the DRX cycle.

8. The method of claim 7, wherein the transmitting the PDCP control PDU, based on the detected state of the DRX cycle, comprises transmitting the PDCP control PDU on the link associated with the master eNB, when the active state of the DRX cycle of the link associated with the master eNB is detected.

9. The method of claim 7, wherein transmitting the PDCP control PDU, based on the detected state of the DRX cycle, comprises transmitting the PDCP control PDU on the link associated with the secondary eNB, when the DRX state of the link associated with the master eNB is detected.

10. The method of claim 7, wherein transmitting the PDCP Control PDU on the link associated with the master eNB, if the UL grant is unavailable for the master eNB, comprises:
    detecting whether a state of a discontinuous reception (DRX) cycle of the link associated with the secondary eNB is in one of an active state and a DRX state; and
    transmitting the PDCP control PDU, based on the detected state of the DRX cycle.

11. The method of claim 10, wherein transmitting the PDCP control PDU, based on the detected state of the DRX cycle, comprises transmitting the PDCP Control PDU on the link associated with the secondary eNB, when the active state of the link associated with the DRX cycle of the secondary eNB is detected.

12. The method of claim 10, wherein transmitting the PDCP control PDU, based on the detected state of the DRX cycle, comprises transmitting the PDCP Control PDU on the link associated with the master eNB, when the DRX state of the link associated with the secondary eNB is detected.

* * * * *